June 14, 1960  H. J. WOOD  2,940,338
VARIABLE SPEED DRIVE
Original Filed June 14, 1951  6 Sheets-Sheet 2

Fig. 2.

Homer J. Wood,
INVENTOR.

BY

Attorney

June 14, 1960 H. J. WOOD 2,940,338
VARIABLE SPEED DRIVE
Original Filed June 14, 1951 6 Sheets-Sheet 4

Homer J. Wood,
INVENTOR.

BY
Attorney

June 14, 1960

H. J. WOOD 2,940,338

VARIABLE SPEED DRIVE

Original Filed June 14, 1951

Homer J. Wood,
INVENTOR.

BY
Attorney

June 14, 1960     H. J. WOOD     2,940,338
VARIABLE SPEED DRIVE
Original Filed June 14, 1951     6 Sheets-Sheet 6

Homer J. Wood,
INVENTOR.

BY 
Attorney

United States Patent Office 2,940,338
Patented June 14, 1960

2,940,338
VARIABLE SPEED DRIVE

Homer J. Wood, Sherman Oaks, Calif., assignor to The Garrett Corporation, Los Angeles, Calif., a corporation of California Original application June 14, 1951, Ser. No. 231,600, now Patent No. 2,659,247, dated Nov. 17, 1953. Divided and this application Sept. 8, 1953, Ser. No. 378,810

2 Claims. (Cl. 74—740)

My present invention relates to a unit for supplying air in controlled quantity and includes a compressor and driving means therefor which may be connected to a power source, such as an internal combustion airplane engine, so as to be driven thereby. This is a division of my copending application, Serial No. 231,600, filed June 14, 1951, now Patent No. 2,659,247.

It is an object of the invention to provide for connection to a compressor a compact drive system having a power input shaft which is driven at variable speed, the driving system including variable-ratio gearings or transmissions of simple and compact form, and means, responsive to outside control, for controlling the cooperative functioning of the variable ratio transmissions so that the compressor will be driven at a speed or speeds which will effect predetermined air delivery by the compressor.

It is a further object of the invention to provide a compressor and drive unit having a housing containing first and second variable speed transmisions and incorporating hydraulic means for actuation and control of these transmissions.

It is an object of the invention to provide a compressor drive unit having first and second variable ratio transmissions through which power from a variable speed power source is carried to the compressor impeller which is to be driven at relatively constant speed so that air will be delivered continuously and constantly to an aircraft space such as a cabin or other enclosure.

It is a further object of the invention to provide in this drive unit a variable ratio transmission with control means whereby its driving ratio is changed in response to change in speed of the engine to which the input shaft of the unit is connected.

In this variable ratio transmission there is a simple hydraulic control which acts in response to change in velocity of a rotating part from one range of rotational speed to another.

Further objects and advantages of the invention will be brought out in the following part of the specification wherein detailed description is only exemplary without limiting the scope of the invention set forth in the appended claims or limiting the range of equivalents which may be employed within the broad meaning of the claims.

Referring to the drawings which are for illustrative purposes only.

Figure 2:
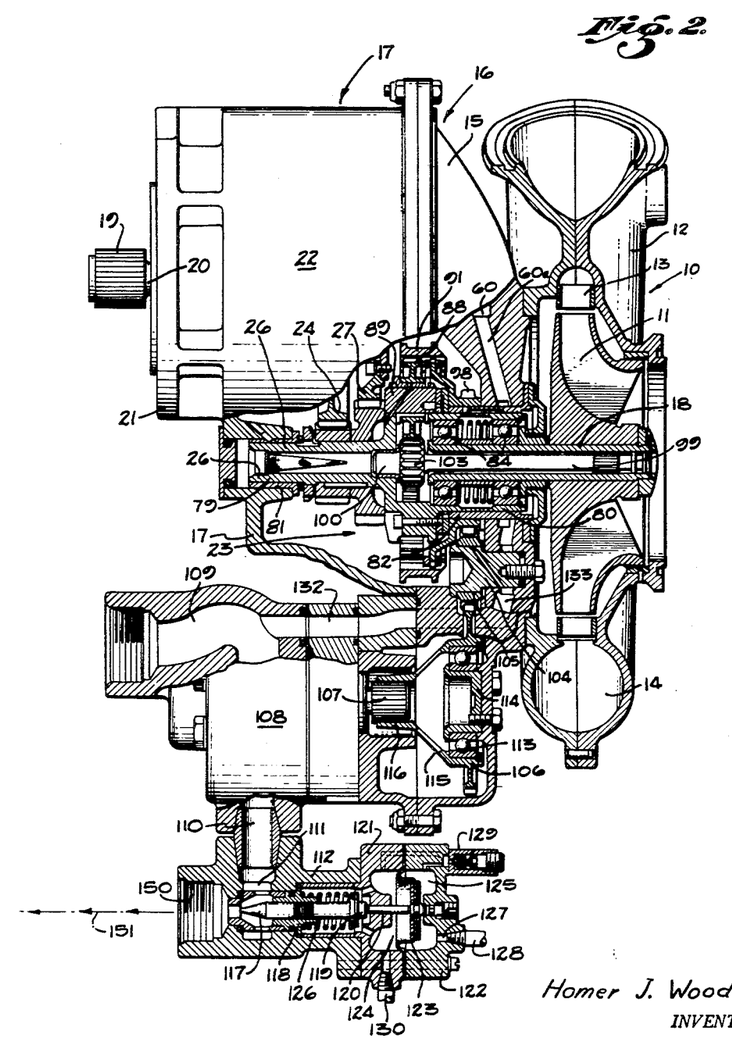
Fig. 2 is a section taken as indicated by the line 2—2 of Fig. 1.

As shown in Fig. 2, the invention includes a compressor 10 comprising an impeller 11 arranged within a shell 12 having a diffuser ring 13 through which the air from the impeller 11 passes into the air passage 14 of the shell 12. The shell 12 is mounted on the front wall member 15 of a housing 16 which includes a transmission case 17 cooperating to provide an enclosure for transmission parts of the compressor drive which will be described hereinafter.

Figure 3:
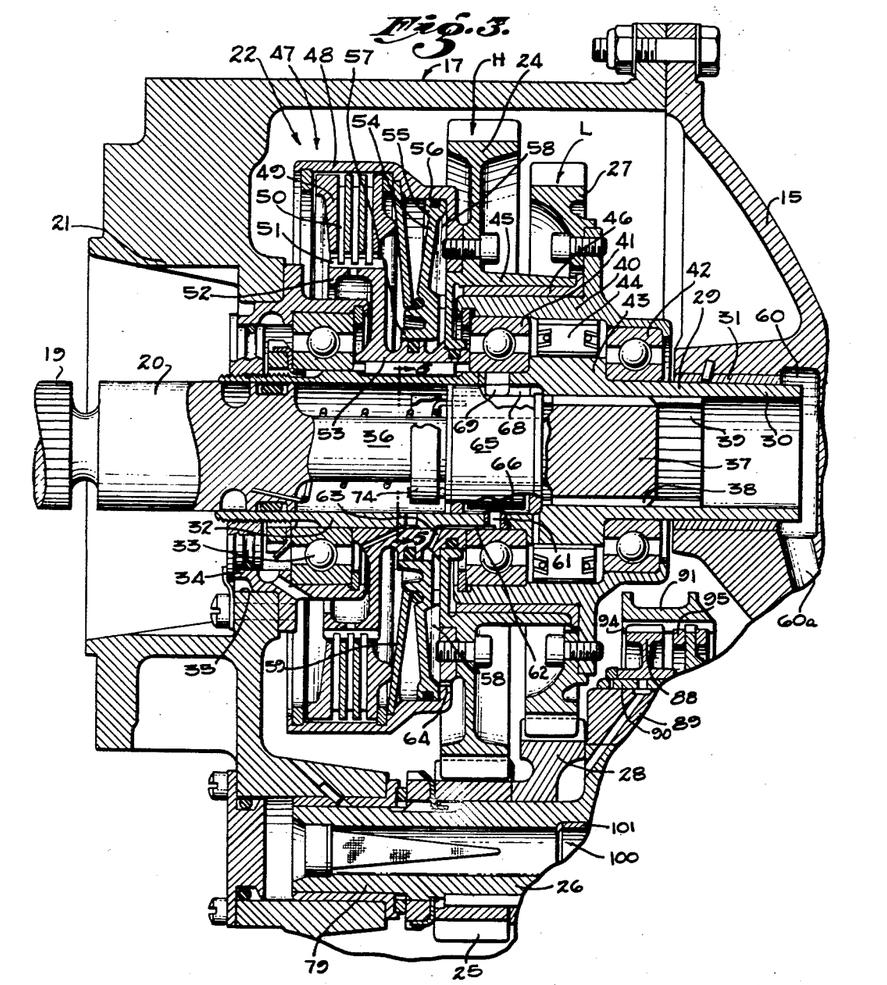
Fig. 3 is a section taken as indicated by the line 3—3 of Fig. 1.

The impeller 11 is fixed on the projecting portion of a shaft 18 which extends through an opening in the front wall member 15 of the housing 16. A splined end 19 of a power receiving shaft 20 projects from the rear wall 21 of the transmission case 17 as shown in Figs. 2 and 3. This power receiving shaft 20 is adapted for connection to a power source such as a variable speed internal combustion engine of an aircraft. The power received by the shaft 20 is carried to the shaft 18 which mounts the impeller 11 through a first variable speed transmission 22, details of which are shown in Fig. 3 and a second variable speed transmission 23, shown in Figs. 2, 7 and 8.

The first variable speed transmission 22 embodies automatic speed changing means acting in response to variation in speed of the power input shaft 20, and the second variable speed transmission 23 is controlled by deviation, from a prescribed condition, of the air which passes through the supercharger to a space within the aircraft. For example, the second variable speed transmission 23 may be controlled either by air flow or pressure.

The first variable speed transmission 22 has high and low ratios gear trains H and L arranged to be selectively driven by the power receiving shaft 20. The high ratio gear train H comprises a gear 24 arranged co-axially of the shaft 20 and a gear 25 which is fixed on a shaft 26 constituting the power input shaft of the second variable speed transmission 23. The low ratio gear train L of the transmission 23 comprises a gear 27 of smaller diameter than the gear 24 arranged to drive a gear 28 fixed on the shaft 26. The shaft 20 extends axially into and drives a hollow shaft or quill 29 one end 30 of which is rotatably supported by a bearing 31 supported by the front wall member 15, and the other end 32 of which is supported by a ball bearing 33 carried by a bearing case 34 supported in the opening 35 of the transmission case 17. Within the hollow shaft 29, the shaft 20 has a shank 36 which supports a head 37 having external splines 38 arranged for driving engagement with internal splines 39 of the hollow shaft 29.

The gear 27 is mounted on a cylindric wall 40 which is rotatably supported on the hollow shaft 29 by bearings 41 and 42. The bearings 41 and 42 are arranged on opposite sides of a collar 43 which is formed on the hollow shaft 29, and between the collar 43 and the cylindrical member 40 there is a one-way or "free-wheeling" clutch 44 through which the hollow shaft 29 will drive the low ratio gear 27 provided the gear 27 is not being otherwise driven at a speed of rotation greater than the speed of rotation of the hollow shaft 29. The high ratio gear 24 is mounted on a cylindrical wall 45 supported for rotation upon a portion of the cylindrical wall 40 by a bearing sleeve 46 carried by the cylindrical wall 40. A fluid actuated clutch 47 is arranged to connect the high ratio gear 24 to the hollow shaft 29 so that the high ratio gear 24 will drive the shaft 26 through the gear 25. At this time the gear 28 on the shaft 26, which gear 28 is larger than the gear 25, will drive the gear 27 at a rotative speed greater than the speed of the gear 24 and therefore greater than the speed of the hollow shaft 29, the one-way clutch 44 permitting the gear 27 to rotate upon the hollow shaft 29 at a speed higher than the speed of the shaft 29.

The clutch 47 comprises a shell 48 which is connected to the gear 24 so as to rotate therewith. The shell 48 supports a plurality of annular friction plates 49 adapted to frictionally drive a plurality of annular friction plates 50, the inner edges of which engage peripheral projections 51 on a drum 52, which hub or drum 52 has a cylindrical wall 53 of reduced diameter surrounding and keyed to the portion of the hollow shaft 29 between the bearings 33 and 41.

Within the rightward portion of the shell 48 of the clutch 47 there is an annular piston 54 having its peripheral portion 55 in sliding engagement with the cylindric wall 56 of the shell 48, and having its inner annular portion 57 in sliding engagement with a portion of the cylindrical wall 53 of the hub 52. When fluid pressure is applied to the cylinder space 58, the piston 54 will be forced leftwardly and, through a dished ring 59, the movement of the piston 54 will be transmitted to the rightward friction plate 49, thereby forcing the plates 49 and 50 of the clutch 47 into pressural engagement so that the plates 50 will frictionally drive the plates 49. The clutch 47 will now drive the gear 24, and the variable speed transmission 22 will be operating in its high-speed ratio.

It is a feature of the invention that means are provided for actuating the clutch only when the power receiving shaft 20 is rotating within a low-speed range such as occurs when the airplane engine is idling. The result is, therefore, that when the speed of the shaft 20 drops to idling range, the driving ratio of the transmission 22 is automatically increased from low-speed ratio to high-speed ratio so that the speed of the shaft 26 will not be materially reduced as the result of the decrease in the speed of the shaft 20. The front wall member 15, Fig. 3, has an oil chamber 60 at the inner end of the bearing 31, which communicates with the open end of the hollow shaft 29. Oil under pressure is fed through a duct 60a to the chamber 60, and this oil flows leftwardly within the interior of the hollow shaft 29. During idling rotation of the hollow shaft 29, oil under pressure flows outwardly from the interior of the hollow shaft 29 through a valve port 61 which communicates with an external groove 62 in the hollow shaft 29 and an opening 63 in the cylindrical wall 53 with the cylinder space 58, to apply fluid pressure leftwardly against the piston 54 to accomplish actuation of the clutch 47. There is a small bleed opening 64 in the wall of the cylinder space 58 through which oil may flow outwardly into the interior of the transmission case 17, but this orifice 64 is not capable of releasing the pressure in the cylinder space 58 when the valve port 61 is open.

Figure 5:
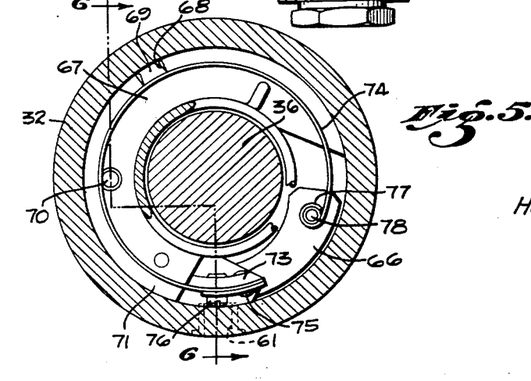
Fig. 5 is a large sectional view taken as indicated by the line 5—5 of Fig. 3, to show the end view of the centrifugal control valve.
Figures 6, 7:
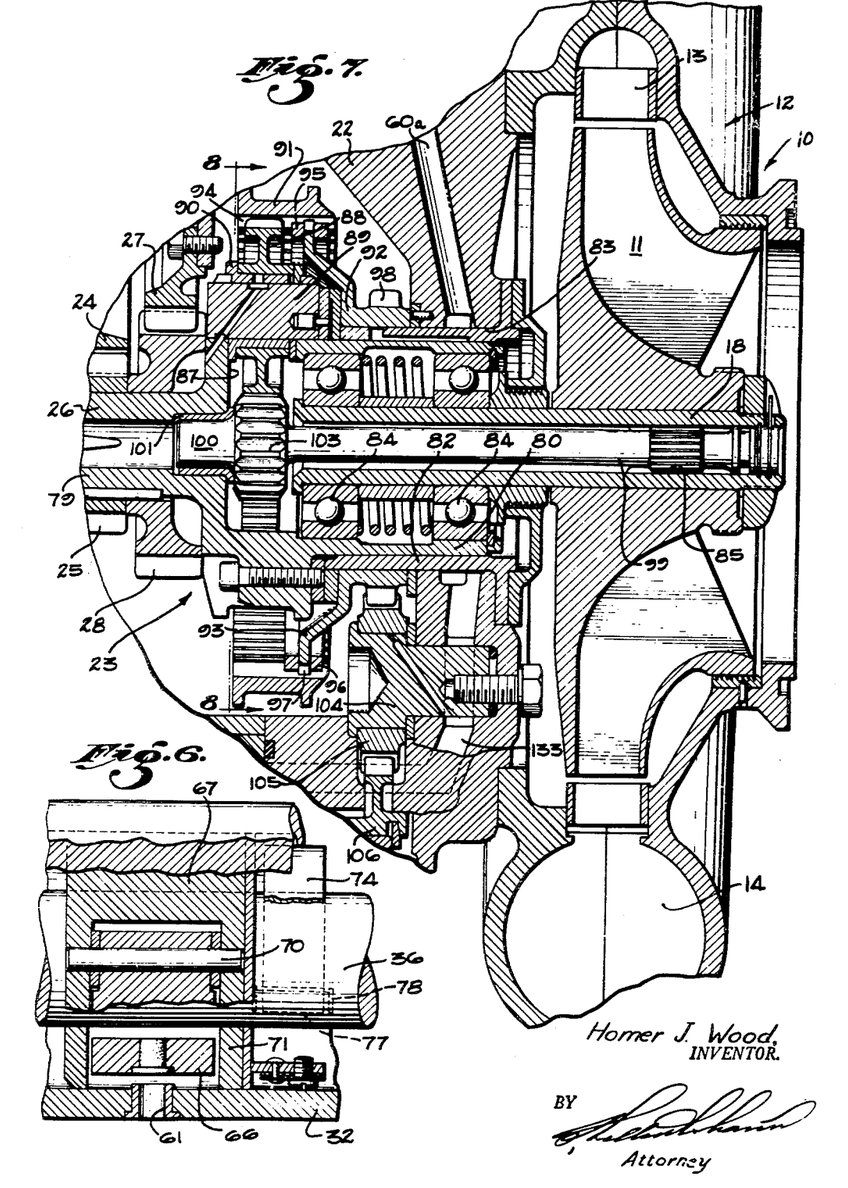
Fig. 6 is a section taken on line 6—6 of Fig. 5 through the centrifugal control valve.
Fig. 7 is a fragmentary sectional view showing to larger scale the planetary gearing of the second variable speed transmission shown in Fig. 2.

Within the hollow shaft 29 there is a centrifugally operated valve device 65 which closes the port 61, when the speed of rotation of the shaft 20 is increased above the idling range. The valve device 65 has a closure member 66 adapted to swing outwardly from the position in which it is shown in Fig. 3, and close the valve port 61 when a predetermined speed of rotation of the members 20 and 29 is reached, for example, 1500 to 1600 r.p.m. As shown in Figs. 5 and 6, the valve device 65 comprises a U-shaped frame 67 arranged to be slipped over a portion of the shank 36 of the shaft 20. This frame 67 has a key-way 68 arranged circumferentially so as to receive a key 69 which projects inwardly from the wall of the hollow shaft 29 as shown in Fig. 3. The closure member 66 is of arcuate form and is swung on a pin 70 carried by one side 71 of the frame 66, so as to extend across the opening 72 of the frame 67. Near the pin 70 the side 71 of the frame 67 has a laterally projecting bracket 73 to which a leaf spring 74 is secured by means of a rivet 75 and an adjusting screw 76. The other end of the spring 74 has a loop 77 formed thereon for engagement with a pin 78 which projects laterally from the closure member 66.

The spring 74 controls the outward movement of the closure member 66 as follows. When the engine which drives the shaft 20 is idling, the speed of rotation of the shaft 20 will be considerably below 1500 r.p.m. When the engine is speeded up to power delivery range, the velocity of the shaft 20 will be in the range of 2000 r.p.m. or greater, with the result that the closure member 66 will be swung out into a position to close the port 61, shutting off the supply of oil under pressure to the cylinder space 58, whereupon oil pressure will bleed out through the orifice 64 and the clutch 47 will be released so that the gear 24 will not now be driven and the one-way clutch 44 will now act to drive the low ratio gear 27. The result of this is that the shaft 26 will not have its speed of rotation increased to the speed of rotation of the power receiving shaft 20 when such latter speed is increased to a predetermined point.

Figure 8:
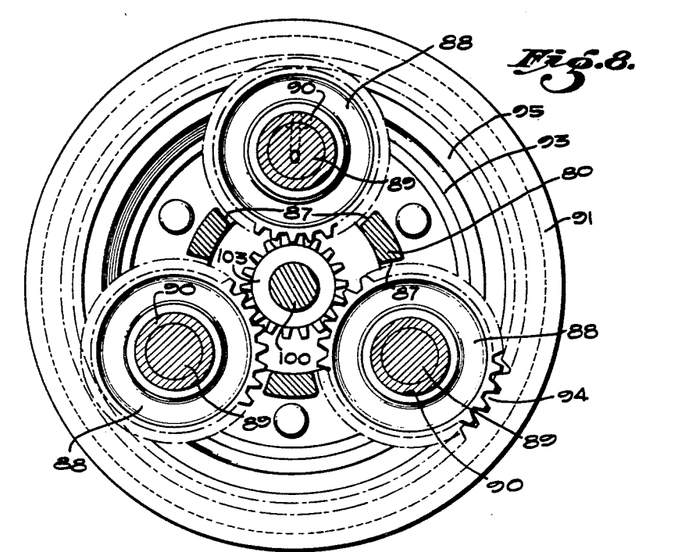
Fig. 8 is a cross-section taken as indicated by the line 8—8 of Fig. 7.

As shown in Figs. 2, 7 and 8, the shaft 26 comprises a small diameter stem portion 79 and a cylindrical portion 80 of materially larger diameter. The leftward end of the stem 79 is rotatably supported by a bearing sleeve 81 carried by the transmission case 17. The front or rightward end portion of the cylindrical part 80 is rotatably supported by a bearing sleeve 82 supported in the opening 83 in the front wall member 15. The cylindrical portion 80 of the shaft 26 has therein spaced ball bearings 84 which rotatably support the inwardly projecting part of the impeller-supporting shaft 18 which is of hollow construction and has, near the front end thereof, internal splines 85. The inner or leftward end of the cylindrical portion 80 of the shaft 26 has thereon an annular rib or hub through which radial openings 87 are milled to receive planet gears 88. Shafts 89 are extended across the openings 87, in positions parallel to the axis of the shaft 26, so as to carry sleeve bearings 90 which rotatably support the planet gears 88.

A ring gear 91 is supported around and in engagement with the gears 88 by a hub member 92 which is rotatably supported on the exterior of the inwardly projecting portion of the sleeve 82, this hub 92 having an annular web 93 with a peripheral portion which extends within the ring gear 91. The ring gear 91 comprises an alloy steel ring having internal gear teeth 94 extending from face-to-face thereof. The web 93 is held within the ring gear 91 by rings 95 which extend into spaced internal grooves 96, on opposite sides of the peripheral portion of the web 93, and the periphery of the web 93 has teeth 97 to engage portions of the teeth 94 of the ring gear 91. The hub 92 has spur gear teeth 98 thereon. To drive the tubular shaft 18 which supports the impeller 11, a floating shaft 99 is provided; this shaft 99 has an end 100 which rotates in a bearing 101 carried by the shaft member 26, and extends throughout the greater portion of its length within the tubular shaft 18, there being splines on the forward or outer end of the shaft 99 for driving engagement with the internal splines 85 of the shaft 18. On the inner portions of the shaft 99, adjacent the inner end of the shaft 18, there is a sun gear 103 having teeth which engage the teeth of the planet gears 88.

As shown in Fig. 2, the front wall member 15 of the housing 16 carries a bearing 104 which supports an idler gear 105 in position to mesh with the gear teeth 98 and also with the teeth of a pump driving gear 106. By this arrangement rotation of the ring gear 91 will be transmitted to the splined shaft 107 of a rotary pump 108 which receives oil from a passage 109 and discharges the same through a passage 110 to the inlet 111 of a flow controlling valve 112 adapted to restrict the outflow of oil through the discharge passage 110 of the pump 108 so that the pump 108 will react against rotation of the ring gear 91, slowing this ring gear 91 so that the planet gears 88 will roll within the ring gear 91 and thereby effect forward rotation of the gear 103 which will be transmitted through the shaft 99 and the hollow shaft 18 to the impeller 11.

The pump-driving gear 106 is supported by a ball bearing 113 which is in turn supported by a hub 114 attached to the inner face of the wall member 15 in a position confronting the rotary pump 108. From the body of the gear 106 a converging wall 115 extends to an internally splined sleeve 116 which engages the splined shaft 107 of the pump 108.

The control valve 112 includes a needle valve or closure part 117 supported for axial movement within the casing of the control valve by a guide 118. The outer end 119 of the needle valve 117 confronts a thrust pin 120 supported by a housing member 121 which cooperates with a second housing member 122 to form a diaphragm chamber traversed by a diaphragm 123 which divides the diaphragm chamber into spaces 124 and 125. A compression spring 126 urges the needle valve 117 outwardly, and this outward movement of the needle valve 117 is transmitted by the thrust pin 20 to the center of the diaphragm 123. The space 125 has a pressure port 127 for connection to a source of controlling fluid pressure through conduit means such as shown at 128, and a pressure relief valve 129 is arranged to connect the spaces 125 and 124. The space 124 is adapted to be connected to the interior of the housing 16 through use of a conduit 130. In the control of the operation of the variable ratio device 23, as need for higher speed of rotation of the impeller 11 is required, the fluid pressure transmitted through the port 127 to the space 125 is increased, thereby moving the diaphragm 123 leftwardly against the resistance of the spring 126, moving the needle valve 117 leftwardly to increase the restriction of flow of oil from the pump 108 so that the pump 108 will increase its reaction against rotation of the ring gear 91 and reduce its speed so as to thereby cause the variable speed transmission 23 to drive the impeller 11 at an increased velocity. It will be understod that as conditions require a reduction in the speed of the impeller 11, a reduction in the pressure in the chamber 125 will accomplish this result.

Figure 1:
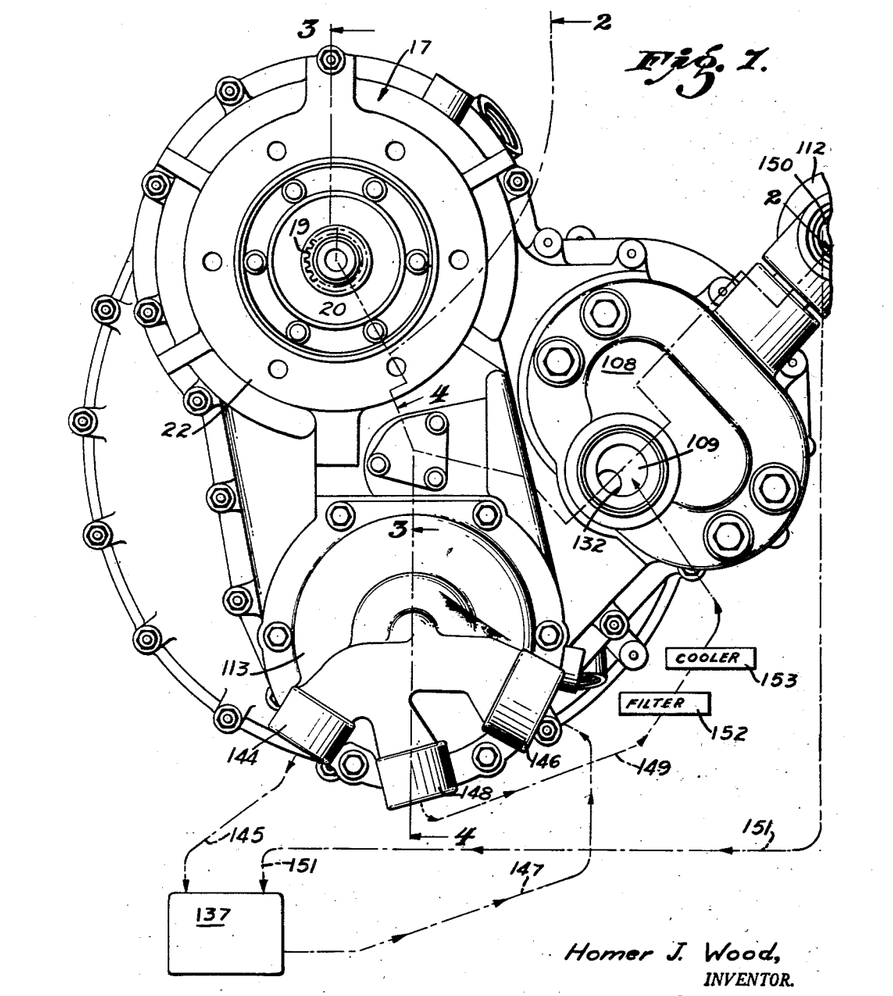
Fig. 1 is a face view of the power input end of the compressor and drive.
Figure 4:
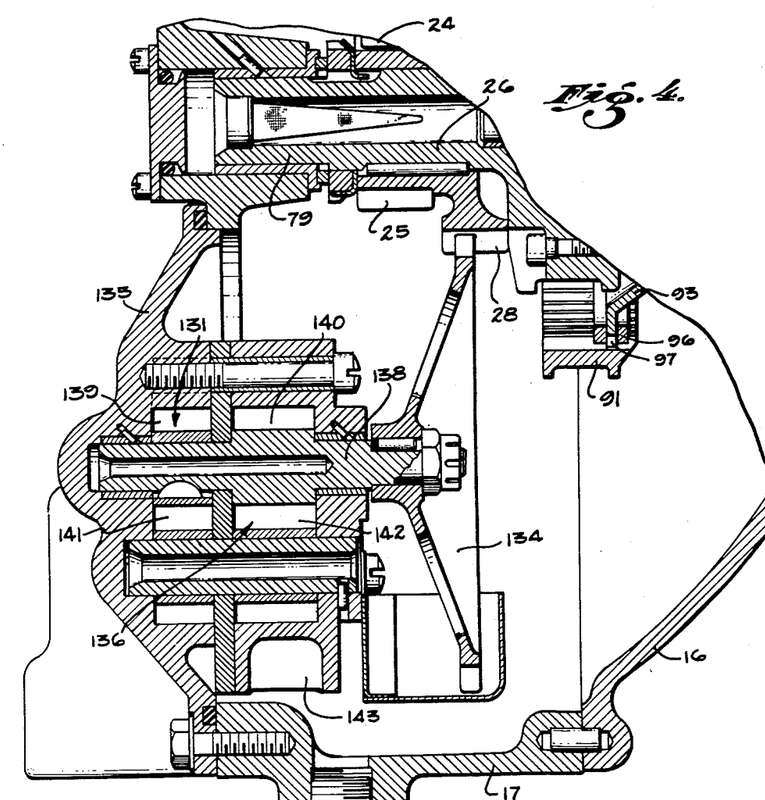
Fig. 4 is a fragmentary section taken as indicated by the line 4—4 of Fig. 1.

The oil passage 109, Fig. 2, is adapted to receive oil oil under pressure from an oil pump 131, Figs. 1 and 4. The oil passage 109 comunicates through a passage 132 in the housing of the oil pump 108 with an oil passage 133 formed within the front wall member 15 of the housing 16. The passage 133 communcates with the oil passage 60 so that oil under pressure will be delivered to the oil chamber 59, Fig. 3, to supply oil under pressure to the variable ratio transmission 22 to actuate and also lubricate the same. The oil passage 133 is arranged within the front member 15 so as to supply oil to the second variable speed transmission and moving parts associated therewith.

Figure 9:
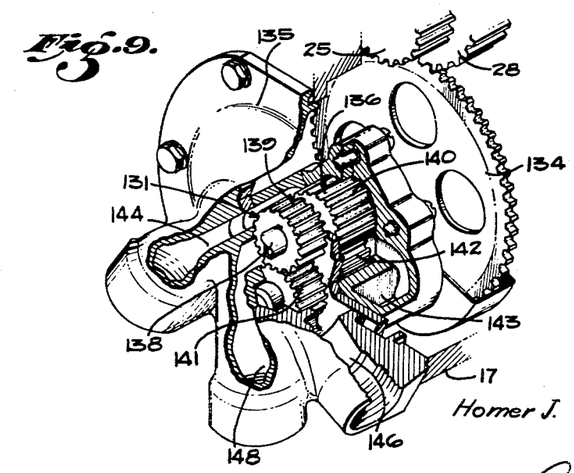
Fig. 9 is a fragmentary sectional perspective view of the pumps shown in Fig. 4.

The oil pump 131, as shown in Figs. 4 and 9, is arranged internally with respect to the casing 17, so that it may be driven by a gear 134 from the gear 28 which is fixed on the shaft 26 of the transmission 23. The pump 131 is mounted on the inner face of a cover plate 135 in side-by-side relation to scavenger pump 136 which transmits oil from the interior of the housing 16 of the device to an oil reservoir 137 schematically indicated in Fig. 1.

The pump driving gear 134 is fixed on the projecting end of a shaft 138 which drives gears 139 and 140 respectively of the pumps 131 and 136. The gears 139 and 140 mesh respectively with gears 141 and 142 of the pumps 131 and 136. The shaft 138, therefore, serves to drive both the pumps 131 and 136 simultaneously.

The circulation of oil in this supercharger drive is as follows: The scavenger pump 136 has an inlet 143, Fig. 9, communicating with the interior of the housing 16, and an outlet 144 which is connected through a duct 145 with the reservoir 137. The oil pump 131 has an inlet passage 146 which communicates through a duct 147 with the oil reservoir 137, and the pump 131 has an outlet 148 which is connected to a duct 149 with the inlet passage 109 of the pump 108, as schematically shown in Fig. 1. The outlet port 150 of the valve 112 is connected through an oil return duct 151 with the reservoir 137 so that the oil pumped by the reaction pump 108 will be returned to the reservoir 137. It will be understood that in the oil circulating system described in the foregoing, customary adjuncts such as filtering and cooling means may be employed as indicated at 152 and 153 in Fig. 1, which means, however, do not form a part of the invention disclosed and claimed herein.

I claim:

1. In a drive for a variable speed compressor: a support; an output member projecting from said support for connection to the compressor which is to be driven; a plural speed change transmission connected to said output member so as to drive the same; and a plural speed change transmission arranged to drive said first named transmission, one of said transmissions comprising a first hollow shaft, the outer end of said shaft being adapted for driving a rotating part, a second shaft supported for rotation at the inner end of said hollow shaft, said second shaft having a portion adapted to be driven and a tubular extension surrounding a portion of said hollow shaft, external bearing means mounted in said support to encircle and rotatably support said tubular extension relative to said support, axially spaced bearing means within said tubular extension, said hollow shaft being supported by said axially spaced bearing means for rotation, a floating shaft having the outer end thereof extending into said hollow shaft, said floating shaft being a loose fit within said hollow shaft, flexible drive means drivingly connecting the outer end of said floating shaft to said hollow shaft, the inner end of said floating shaft being rotatably supported by the inner end of said second shaft, planet gears supported by said second shaft at the inner end of said hollow shaft, a sun gear at the inner end of said hollow shaft meshed with said planet gears, said sun gear being connected to said floating shaft, a ring gear rotatably supported on said external bearing means concentrically of said tubular extension and meshed with said planet gears, and means connected through gearing with said ring gear for varying the rate of rotation of said ring gear in reverse order to the rate of rotation of said hollow shaft.

2. In a transmission the combination of: a support; a hollow shaft rotatably supported within said support; a second shaft arranged in axial alignment with said hollow shaft for driving said hollow shaft, said second shaft having a tubular extension surrounding and being rotatably supported at its inner end by said hollow shaft; external bearing means mounted in said support to encircle and rotatably support said tubular extension relative to said support; internal bearing means between said tubular extension and said hollow shaft, said hollow shaft being supported by said internal bearing means; a floating shaft having one end thereof extending into said hollow shaft, said floating shaft being a loose fit within said hollow shaft; splined flexible drive means in said hollow shaft drivingly connecting the outer end of said one end to said hollow shaft, the other end of said floating shaft being rotatably supported by the inner end of said second shaft; a sun gear integral with said floating shaft and arranged between the adjacent ends of said hollow shaft and said second shaft; planet gears meshed with said sun gear to revolve around said sun gear, said planet gears being rotatably supported by said second shaft at the end of said tubular extension contiguous to said second shaft; a ring gear rotatably supported on said external bearing means concentrically of said tubular extension and meshed with said planet gears; and means connected through gearing with said ring gear for controlling the rotation of said ring gear.

References Cited in the file of this patent:

UNITED STATES PATENTS

| | | |
|---|---|---|
| 1,765,822 | Bronander | June 24, 1930 |
| 1,961,679 | Walti | June 5, 1934 |
| 2,103,149 | Cutler | Dec. 21, 1937 |
| 2,212,046 | Ross | Aug. 20, 1940 |
| 2,289,285 | Chilton | July 7, 1942 |
| 2,328,291 | Osborne | Aug. 31, 1943 |
| 2,377,199 | Adams et al. | May 29, 1945 |
| 2,451,767 | Nardone | Oct. 19, 1948 |
| 2,559,128 | McFarland | July 3, 1951 |
| 2,583,556 | Fleischel | Jan. 29, 1952 |
| 2,625,047 | Wood | Jan. 13, 1953 |
| 2,715,834 | Chamberlin | Aug. 23, 1955 |
| 2,737,064 | Stoeckicht | Mar. 6, 1956 |

UNITED STATES PATENT OFFICE

CERTIFICATE OF CORRECTION

Patent No. 2,940,338                                   June 14, 1960

Homer J. Wood

It is hereby certified that error appears in the printed specification of the above numbered patent requiring correction and that the said Letters Patent should read as corrected below.

Column 5, line 51, strike out "oil", first occurrence; column 6, line 22, strike out "variable speed" and insert the same after "a", first occurrence, same line.

Signed and sealed this 20th day of December 1960.

(SEAL)
Attest:
KARL H. AXLINE
Attesting Officer

ROBERT C. WATSON
Commissioner of Patents